United States Patent Office 3,640,966
Patented Feb. 8, 1972

3,640,966
PROCESS FOR THE PREPARATION OF POLY-ISOCYANATES WHICH CONTAIN A CARBO-DIIMIDE-ISOCYANATE ADDUCT
Hans Joachim Hennig, Cologne-Stammheim, and Peter Fischer, Cologne-Flittard, Germany, assignors to Farbenfabriken Bayer Aktiengesellschaft, Leverkusen, Germany
No Drawing. Filed Jan. 23, 1969, Ser. No. 793,547
Claims priority, application Germany, Jan. 25, 1968,
P 16 68 083.4
Int. Cl. C08g 22/00, 22/18
U.S. Cl. 260—77.5 R    9 Claims

ABSTRACT OF THE DISCLOSURE

Polyisocyanates containing a carbodiimide-isocyanate adduct are prepared by heating an organic polyisocyanate containing nitrogen atoms only in the isocyanato groups in the presence of a catalytic amount of a catalyst to a temperature above 150° C. and cooling the reaction product to about room temperature, wherein said catalyst is an organic isocyanate compound containing biuret, urea, amido, urethane, allophanate, isocyanurate, uretdione or uretonimine groups in the compound.

---

This invention relates to a process for producing polyisocyanate compositions and more particularly to a process for producing polyisocyanates which contain a carbodiimide-isocyanate adduct.

It has been heretofore known that organic isocyanates can be converted into carbodiimides with elimination of carbon dioxide by prolonged heating at high temperatures. In addition, numerous catalysts are also known which enable organic isocyanates to be converted into carbodiimides under mild temperature conditions, such as, for example, organic compounds of the elements of Main Group 5 of the Periodic Table. If, however, the isocyanate groups of polyisocyanates are to be only partly converted into carbodiimide groups, the use of highly active catalysts is not desirable because the modified polyisocyanates would have insufficient stability on storage owing to the continuation of the reaction which would be extremely disadvantageous in practice. On the other hand, treating polyisocyanates without catalysts at high temperatures to effect partial conversion into carbodiimides is time consuming and yields dark colored reaction products owing to uncontrollable side reactions.

Therefore, there exists a recognized need for acceptable catalysts which can be used for the production of polyisocyanates containing a carbodiimide-isocyanate adduct, particularly for application in a continuous process. These catalysts should have a good catalytic activity at elevated temperatures but should be completely inactive under the temperature conditions encountered in storage and working up of the reaction products. Furthermore, these catalysts should preferably be present in liquid form in order to allow continuous dosing to be carried out easily. Another requirement for such a catalyst is that it should be substantially completely soluble in the polyisocyanate which is to be modified because only rapid and homogeneous mixing ensures a controllable reaction course, especially in a continuous process. It is also desirable that the catalyst or decomposition products of the catalyst which may be removed with the carbon dioxide, should not interfere with the carrying out of the process.

It is an object of this invention to provide an improved process for the production of organic polyisocyanates containing a carbodiimide-isocyanate adduct. It is another object of this invention to provide an improved process for the production of organic polyisocyanates containing a carbodiimide-isocyanate adduct which is devoid of the foregoing disadvantages and problems. A further object of this invention is to provide an improved process for the production of organic polyisocyanates containing a carbodiimide-isocyanate adduct in a single working step, that is, in a continuous process. A still further additional object of this invention is to provide an improved process for the production of organic polyisocyanates containing a carbodiimide-isocyanate adduct with catalysts that have good catalytic activity at elevated temperatures but are completely inactive under the temperature conditions encountered in storage and working up of the reaction products. Yet another object of this invention is to provide organic polyisocyanates containing a carbodiimide-isocyanate adduct produced by an improved process, especially in a single working step.

The foregoing objects and others which will become apparent from the following description are accomplished in accordance with the invention, generally speaking, by providing a process for the production of organic polyisocyanates which contain a carbodiimide-isocyanate adduct by heating organic polyisocyanates which are free from nitrogen atoms except in the —NCO groups, that is, contain nitrogen atoms only in the —NCO groups, to a temperature above 150° C. in the presence of catalytic amounts of organic compounds which contain one or more isocyanato groups and in addition biuret, urea, amido, urethane, allophanate, isocyanurate, uretdione or uretonimine groups as catalysts, and cooling the resulting reaction products to about room temperature.

In the process according to this invention, any suitable polyisocyanates which are free from nitrogen, that is, those organic polyisocyanates which do not contain any nitrogen atoms apart from those in the —NCO groups, may be used either alone or in admixture. Any such suitable aliphatic, cycloaliphatic, aromatic or aliphatic polyisocyanate may be employed. Preferably the organic polyisocyanates are aliphatic, cycloaliphatic, aromatic or araliphatic hydrocarbon polyisocyanates which may be substituted by substituents non-reactive with —NCO groups. As examples of such suitable organic polyisocyanates there may be mentioned the following: tetramethylene diisocyanate, 1,6-hexamethylene diisocyanate, 2,2,4-trimethyl-1,6-diisocyanatohexane, 1,9-nonane diisocyanate, 1,10-decamethylene diisocyanate, 1,12-dodecane diisocyanate, 1,4-cyclohexane diisocyanate, isophorone diisocyanate, m- and p-xylene diisocyanates and isomeric mixtures of these two diisocyanates, 1,3- and 1,4-phenylene diisocyanates, 1,3,5-triisopropyl-2,4-diisocyanatobenzene, 4-chloro-1,3-phenylene diisocyanate, 2,4- and 2,6-toluene diisocyanate and any mixtures of these isomers such as an 80/20 mixture of 2,4- and 2,6-toluene diisocyanate, 4,4'-, 2,4'- and 2,2'-diphenylmethane diisocyanates and any isomeric mixtures of these diphenylmethane diisocyanates, 4,4'-diphenylene diisocyanate, 4,4'-diphenylsulphone diisocyanate, 4,4'-dicyclohexylmethane diisocyanate, 4,4'-diphenylpropane diisocyanate, 1,5-naphthalene diisocyanate, 1,3,5-benzene triisocyanate, 4,4',4"-triphenylmethane triisocyanate and the like. Especially preferred are 4,4'-diphenylmethane diisocyanate and its mixtures with the 2,4'- and 2,2'-diphenylmethane diisocyanate isomers.

According to the invention, it is also possible to use organic onoisocyanates in addition to the polyisocyanates. The following are named as examples of such monoisocyanates: methylisocyanate, ethylisocyanate, butylisocyanate, octylisocyanate, octadecylisocyanate, allylisocyanate, vinylisocyanate, phenylisocyanate, m- and p-toluene isocyanate, p-chlorophenylisocyanate, p-methoxyphenylisocyanate, cyclohexylisocyanate, and 2,6-diisopropyl phenylisocyanate, 4-biphenylisocyanate, decahydronaphthalene isocyanate and the like.

The catalysts which may be used according to the process of this invention may be any suitable organic compounds that contain one or more isocyanato groups and in addition biuret, urea, amido, urethane, allophanate, isocyanurate, uretdione or uretonimine groups. As examples of such compounds there may be mentioned as representative the following examples of such catalysts:

tri-(isocyanato-hexyl)-biuret,
di-(isocyanato-hexyl)-urea,
tri-(isocyanatohexyl)-isocyanurate,
tri-(isocyanatononyl)-biuret,
tri-(isocyanatododecyl)-biuret,
N-(isocyanatotrimethylhexyl)-N'-diisopropylphenyl)-urea,
N-(isocyanatotrimethylhexyl)-N'-diisobutyl-urea, isocyanatoureas such as those which are obtained, for example, by reacting 4,4'-diphenyldimethylmethane diisocyanate, isophorone diisocyanate or m- and p-xylylene diisocyanates with diisopropylaniline, diisobutylamine or 2-ethylhexylamine using a 1:1 molar ratio, N-(isocyanato-trimethylhexyl)-2-ethylcaproic acid amide, uretonimine compounds, such as, for example, that which is formed by addition of 1,6-hexamethylene diisocyanate to bis-(diisocyanatohexyl)-carbodiimide, bis-(isocyanatohexyl)-uretdione, N - isocyanatohexyl - O - tertiary - butyl-urethane or N - [isocyanato - (trimethyl) - hexyl]-O-isopropyl - urethane, or allophanates such as that which can be obtained by reacting 1,6-hexamethylene diisocyanate with 2-ethylhexanol using a 2:1 molar ratio and the like. The catalysts which may be used according to this invention are preferably liquid at room temperature and in general do not contain substituents reactive with —NCO groups apart from the mentioned biuret, urea, amido, urethane and allophanate groups. Tri-(isocyanato-hexyl)-biuert is preferred as the catalyst.

According to the invention, the catalyst is added to the organic polyisocyanate in any catalytic quantities, generally from about 0.01 to about 10 mol percent based on the isocyanate reactant. The reaction temperature is above 150° C., generally from about 150° C. to about 300° C., preferably from about 180° C. to about 220° C. The formation of the carbodiimide and simultaneous evolution of carbon dioxide takes place in an endothermic reaction. The progress of the reaction can be controlled by methods which will be obvious to those skilled in the art, for example, by continuous measuring of the isocyanate content, or more conveniently, by measuring the amount of carbon dioxide which has been liberated.

The effectiveness of the catalysts which may be used according to the invention can be demonstrated by comparing the results obtained from the isocyanate determinations and measuring the amount of carbon dioxide gas evolved. Side reactions which use up isocyanate, such as, for example, the formation of isocyanurates, do not occur, or only occur to a minor extent with the catalysts of this invention.

The process according to the invention may be carried out batchwise but is preferably carried out continuously. In the continuous process for preparing polyisocyanates which contain a carbodiimide-isocyanate adduct, the polyisocyanate is preferably passed through a continuous apparatus, such as, for example, a heated reaction tube or a heated reaction chamber, for example, a reaction tower, and the catalyst, which is preferably liquid and completely soluble, is continuously mixed with the polyisocyanate before the hot reaction zone is reached. The addition of catalyst may, however, also be carried out in the heated reaction chamber.

The degree of conversion of the isocyanate groups of the polyisocyanate into carbodiimide groups can be regulated by the rate of flow through the apparatus, that is, the time of residence in the reaction zone, the quantity of catalyst and the reaction temperature.

The reaction product is advantageously chilled to about room temperatures of less than 150° C., preferably from about 20° C. to about 60° C., immediately after leaving the hot reaction zone. When the process is carried out continuously, this cooling can be achieved especially easily by means of a heat exchanger. The sudden cooling instantaneously brings the formation of carbodiimide to a stop and the critical temperature regions in which, for example, the diisocyanates of diphenylmethane tend to form dimers, that is, isocyanato-uretdiones, can be by-passed so that such unwanted side reactions do not occur. Carbodiimides add to isocyanates in the cold to form uretone imines so that polyisocyanates containing a carbodiimide-isocyanate adduct (polyisocyanates containing uretonimine groups) are obtained by the process according to the invention.

The carbon dioxide which is split off is preferably cooled by means of a heat exchanger and may, if desired, be freed from isocyanate which has been entrained with it by washing with an inert washing liquid, such as, for example, chlorobenzene or toluene, before the carbon dioxide is conveyed to a measuring apparatus. One may also use a washing liquid the polyisocyanate which has been liberated from the catalyst and entrained by the carbon dioxide, provided that this polyisocyanate has both a lower boiling point and a lower melting point than the polyisocyanate which is to be modified.

The process according to the invention may also be carried out in the presence of any suitable inert high boiling solvents such as benzene, toluene, xylene, decalin, tetradecalin, chlorobenzene, o-dichlorobenzene, trichlorobenzene and the like. Any suitable inert solvent may also be used for dissolving and diluting the catalyst. The inert organic solvents which may be employed in the process of this invention contain no groups reactive with —NCO groups.

Depending on the type of the polyisocyanate which is to be modified, it may be advantageous to carry out the process according to the invention under any suitable reduced pressure or under excess pressure.

The products of the process are, for example, viscous liquids or solid resins. They are eminently suitable for the production of foam resins, especially hard foams, and have an extremely low vapor pressure, practically no odor and are non-toxic. The products of the process are highly stable on storage and when liquid have practically no tendency to crystallize. They are, therefore, especially suitable for use in combination with, for example, hydroxyl-containing polyesters, polyethers, polythioethers, polyacetals and polyamines according to procedures known to those skilled in the art for the production of lacquers, coatings, sheetings, adhesives, or homogeneous or porous, elastic or rigid synthetic resins, in the form of tires, shaft couplings, motor mounts, sound and thermal insulation and in curtain wall construction in the building industry.

The invention is further illustrated but is not intended to be limited by the following examples in which all parts and percentages are by weight unless otherwise specified.

EXAMPLE 1

A mixture of 95% of 4,4'-diphenylmethane diisocyanate and 5% (2.6 mol percent) of tri-(isocyanato-hexyl)-biuret which has been heated to about 100° C. by means of a preheater is fed by means of a pump into the bottom of a reaction tower of refined steel which is about 1.5 m. in height and has an internal volume of about 2.2 liters and is filled with Raschig rings of glass and can be heated from outside to about 220° C. The reaction mixture stays in the hot reaction zone for about 3 hours, the carbon dioxide is split off and is removed from the top of the reaction tower through a pipe. After passing through a gas cooler the carbon dioxide is conducted through a meter to measure the quantity of gas evolved. The polyisocyanate which contains a carbodiimide-isocyanate adduct is removed through an overflow pipe in the upper part of the reaction tower and is chilled to about room temperature by means of a heat exchanger and trapped in a receiver.

The quantity of carbon dioxide split off, which is 17.7 liters (at standard temperature and pressure) per 1 kg. of reaction mixture, corresponds to conversion of about 20% of the isocyanate groups present into carbodiimide groups. The product of the process is pale yellow in color and immediately after the reaction is completed it has an isocyanate content of 27.8% (calculated 27.5%) and a viscosity of 6153 $cp._{20}$.

The carbodiimide groups on standing are subject to further isocyanate addition, the isocyanate content being at the same time reduced and the viscosity increased. After a few days, the isocyanate content is 24.6% (calculated 24.1%).

The product is mixed with 4,4'-diphenylmethane diisocyanate in 1:1 proportions. The isocyanate content of the mixture is 29.3%; the viscosty is 45 $cp._{25}$. It solidifies at —4.5° C.; the free 1,6-hexamethylene diisocyanate content is <0.5%; the dimeric polyisocyanate content (uretdione calculated as molecular weight 500) is 0.4%.

EXAMPLES 4–9

Portions of 970 parts of 4,4'-diisocyanato-diphenylmethane are in each case treated with 30 parts (corresponding to about 3%) of catalyst in the form of an isocyanatourea such as that which is obtained by reacting a diisocyanate with a primary or secondary amine into 1:1 molar ratio, as indicated in the following table, and heated to about 220° C. The activity of the catalysts can be estimated from the time required for the liberation of 17.5 liters of carbon dioxide under normal conditions (corresponding to carbodiimide formation of about 20% of the isocyanate groups present).

| Example No. | Catalyst isocyanatourea from diisocyanate | Amine | Time (hours) | Isocyanate content of the reaction product, percent |
|---|---|---|---|---|
| 4 | 2,2,4-trimethyl-1,6-diisocyanatohexane. | Diisopropyl aniline | 2.1 | 24.1 |
| 5 | do | Diisobutylamine | 13.5 | 24.7 |
| 6 | 4,4'-diisocyanato-diphenyldimethyl-methane. | do | 9.0 | 23.5 |
| 7 | Isophoronediisocyanate | do | 9.5 | 23.6 |
| 8 | m-Xylylenediisocyanate | do | 9.0 | 23.7 |
| 9 | Comparison tests without the addition of catalyst. | | 25.5 | 24.6 |

EXAMPLE 2

In a manner analogous to Example 1, a mixture of 95% of 4,4'-diphenylmethane diisocyantte and 2.5% of the 2,4'-isomer and 0.5% of the 2,2'-isomer and with 2% (1 mol percent) of tri-(isocyanatohexyl)-isocyanurate is heated to about 215° C. The reaction mixture is allowed to stay in the reaction chamber for about 2.5 hours and a yellow brown polyisocyanate which contains a carbodiimide-isocyanate adduct and which has an isocyanate content of 30.0 percent is obtained. The quantity of carbon dioxide eliminated per 1 kg. of mixture is 11.7 liters at 25° C., that is, about 12% of ths isocyanate groups present have been converted into carbodiimide groups.

EXAMPLE 3

About 18.7 kg. per hour of 4,4'-diphenylmethane diisocyanate which is preheated to about 60° C. and therefore liquid which contains small quantities of the 2,4'-isomers and 2,2'-isomers are conveyed by means of a gear wheel pump into a reaction tank which has a volume of about 100 liters and which is at a temperature of about 220° C. The reaction tank is equipped with on efficient stirrer and an overflow with siphon seal so that the effective capacity of the tank is about 70 kg., about 0.62 k g. of tri-(isocyanatohexyl)-biuret (corresponding to 4%, 1.7 mol percent, of catalyst) are fed in per hour by means of a second gear wheel pump. The carbon dioxide formed is cooled to about 20° C. in a heat exchanger and is then conducted through a washing tower through which chlorobenzene is passed to remove the isocyanate which has been carried along with it, and it then passes through a gas meter for measurement. About 340 liters per hour of carbon dioxide (at 20° C.) are formed.

The reaction product which is continuously discharged is cooled to about room temperature by means of a cooler .About 18.7 kg./hour of a pole yellow mixture of polyisocyanate which contains a carbodiimide-isocyanate adduct and 4,4'-diphenylmethone diisocyanate are obtained. The isocyanate content of the reaction product is 25.0% after the product has been left standing for about 48 hours.

EXAMPLE 10

800 g. 4,4'-diisocyanato diphenylmethane, 200 g. 1,6-hexane diisocyanate and 4 g. tris-(isocyanatohexyl)-biuret are heated for 3 hours at 220° C., 20.3 l. $CO_2$ (determined at 23° C.) are split off. The isocyanate content of the reaction mixture drops from 36.9 to 25.9%. The brown coloured reaction product contains about 6% 1,6-hexane diisocyanate.

EXAMPLE 11

696 g. (4 mols) 2,4-toluylene diiisocyanate are heated at 220° C. in presence of 10 g. N,N'-bis-(isocyanato dodecyl)-urea until 20% of the present isocyanate groups are transferred into carbodiimide groups under $CO_2$ evaluation. The isocyanate content of the reaction mixture is 35.6%.

EXAMPLE 12

Similar as in Example 11 348 g. (2 mols) 2,4-toluylene diisocyanate and 336 g. (2 mols) 1,6-hexane diisocyanate are heated for 2.5 hours at 220° C. in presence of 4 g. N-(isocyanatotrimethylhexyl) - N' - diisopropylphenylurea. After 20% of the isocyanate groups originally present have been transferred into carbodiimide groups the isocyanate content is 37%. The yield of the reaction mixture is 649 g.

EXAMPLE 13

680 g. (2.72 mols) 4,4'-diphenylmethane diisocyanate, 300 g. 2,4-toluylene diisocyanate (1.725 mols) and 20 g. tris-(isocyanatohexyl)-biuret (0.04 mol) are heated for 3.5 hours to 220° C. 20% of the isocyanate groups originally present are by this way transferred into carbodiimide groups and 22.4 l. (determined at 23° C.) $CO_2$ are split off. The reaction mixture has a NCO-content of 28.7%.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made

What is claimed is:

1. A process for the preparation of a polyisocyanate containing a carbodiimide-isocyanate adduct comprising heating an organic polyisocyanate containing nitrogen atoms only in the isocyanato groups in the presence of a catalytic amount of a catalyst to a temperature above 150° C. and cooling the reaction product to about room temperature, wherein said catalyst is an organic isocyanate compound containing biuret, urea, amido, isocyanurate, uretdione or unretonimine groups in the compound.

2. The process according to claim 1 wherein the catalyst is employed in an amount of from about 0.01 mol percent to about 10 mol percent.

3. The process according to claim 2 wherein the reaction is carried out continuously in a continuous flow reactor.

4. The process according to claim 2 wherein the catalyst is tri-(isocyanatohexyl)-biuret.

5. The process according to claim 2 wherein the organic polyisocyanate reactant is 4,4'-diphenylmethane diisocyanate.

6. The process according to claim 2 wherein the organic polyisocyanate reactant is an isomeric mixture of 4,4'- and 2,2'-diphenylmethane diisocyanate.

7. The process according to claim 2 wherein the catalyst is tri-(isocyanatohexyl) isocyanurate.

8. The process according to claim 2 wherein the organic polyisocyanate reactant is a toluylene diisocyanate.

9. The process according to claim 2 wherein the organic polyisocyanate reactant is an isomeric mixture of 2,4- and 2,6-toluylene diisocyanate.

References Cited

UNITED STATES PATENTS 2,954,365   9/1960   Windemuth et al. ____ 260—77.5

DONALD E. CZAJA, Primary Examiner

M. J. WELSH, Assistant Examiner

U.S. Cl. X.R.

260—2.5 AT, 75 NT